United States Patent [19]

Cox et al.

[11] Patent Number: 4,761,846
[45] Date of Patent: Aug. 9, 1988

[54] MODULAR BRIDGE WITH TORSION PIPE EXPANSION LOOPS

[75] Inventors: Bobby E. Cox, Kenner; Jay S. Smith, Metairie, both of La.

[73] Assignee: Shell Offshore Inc., Houston, Tex.

[21] Appl. No.: 68,299

[22] Filed: Jun. 30, 1987

[51] Int. Cl.⁴ .............................................. E01D 9/02
[52] U.S. Cl. ................................................ 14/3; 14/7;
14/23; 14/71.1; 14/71.5; 141/388; 137/615;
114/230; 414/137
[58] Field of Search .................. 14/1, 16.1, 16.5, 23,
14/71.1, 71.3, 71.5, 71.7, 7, 3, 6; 405/223;
141/387, 388; 248/49, 58, 68.1; 137/615;
114/230, 264; 414/137, 138, 139

[56] References Cited

U.S. PATENT DOCUMENTS

| | | | |
|---|---|---|---|
| 3,027,633 | 4/1962 | Murphy | 14/7 X |
| 3,721,260 | 3/1973 | Stahmer | 137/615 X |
| 3,765,463 | 10/1973 | Gassett et al. | 141/388 |
| 3,999,498 | 12/1976 | Flory | 114/230 |
| 4,130,134 | 12/1978 | Castle | 137/615 |
| 4,169,296 | 10/1979 | Wipkink et al. | 14/71.1 |
| 4,182,389 | 1/1980 | Guillaume et al. | 114/230 X |
| 4,473,916 | 10/1984 | Connold | 14/71.5 X |

FOREIGN PATENT DOCUMENTS 2910393  4/1980  Fed. Rep. of Germany ....... 14/16.1

OTHER PUBLICATIONS

*Composite Catalog ® of Oil Field Equipment and Services,* (1986–1987), vol. 1, COFLEXIP TM Catalog, pp. 1294–1296.
*Composite Catalog ® of Oil Field Equipment and Services,* (1970–1971), vol. 1, CHIKSAN TM Catalog, pp. 1231–1232.

*Primary Examiner*—Stephen J. Novosad
*Assistant Examiner*—John F. Letchford
*Attorney, Agent, or Firm*—Mark A. Smith

[57] ABSTRACT

A utility bridge suitable for connecting offshore facilities such as offshore platforms is disclosed in which a plurality of helical pipelines provide flow communication between the facilities and relative movement of the facilities in response to environmental forces is provided for by helical pipelines with torsion expansion loops supported by a substantially rigid frame of the utility bridge which has means to prevent coupling of dynamic forces between the respective offshore facilities.

26 Claims, 4 Drawing Sheets

U.S. Patent    Aug. 9, 1988    4,761,846
FIG. 1
(PRIOR ART)
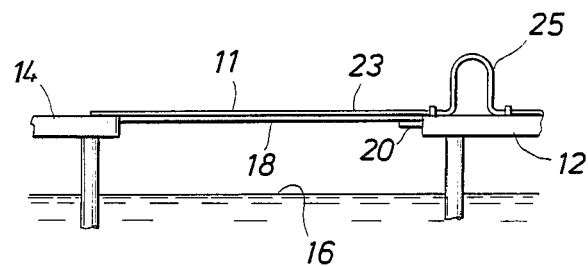
FIG. 2
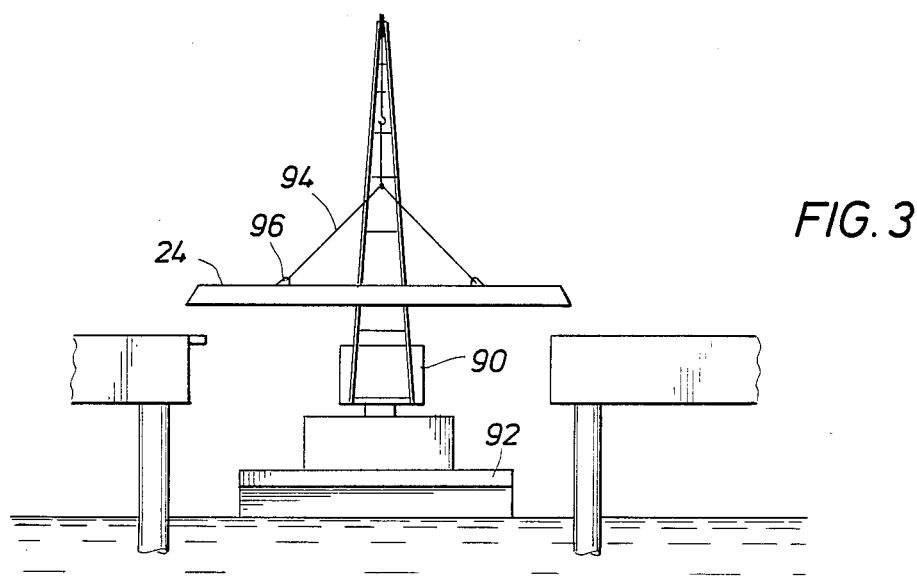
FIG. 3

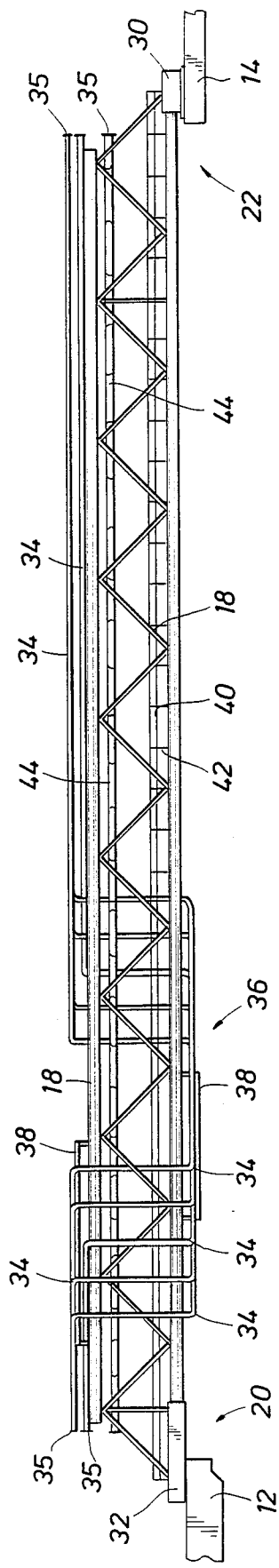

MODULAR BRIDGE WITH TORSION PIPE EXPANSION LOOPS

BACKGROUND OF THE INVENTION

This invention relates to a utility bridge spanning the distance between adjacent facilities subject to relative motion due to wave action on at least one of the facilities and, more particularly, to a utility bridge for connecting offshore platforms which provides a substantially rigid frame disposed between the platforms in such a manner that it will not couple the dynamic response of the respective platforms and a plurality of helical pipelines having torsional expansion loops carried across the frame and establishing a multiplicity of flow lines between the adjacent offshore platforms.

In certain situations it is desired to place a second offshore platform in very close proximity to a first such platform. In some instances the most economic production of oil and gas reserves may justify a second platform nearby an existing platform. In other instances, the efficient production of reserves tapped through drilling from a first platform may be found to be best transported only after preprocessing of the production fluids in on-site facilities requiring a separate production platform installed immediately adjacent the first platform.

In these and other situations requiring a plurality of closely spaced offshore platforms, it is often necessary or desirable to provide for the transport of production fluids from one platform to another and various control and working fluids may also be most economically handled with a common processing facility. Further it is desirable to provide a convenient means for personnel to move between the platforms. However, even conventional rigid leg platforms sway in response to the natural environmental forces in all but the shallowest of offshore waters. This action is accentuated with the height of the structure and in deep water the dynamic response of the platform commonly results in a deflection of several feet at the height of the platform deck.

This dynamic response of offshore platforms creates a problem in joining the adjacent platforms with a bridge because differences in the design, orientation, weight distribution, natural period, time delays between the impact of wave forces to the respective platforms and a myriad of other factors cause the platforms to move independently. A rigid linkage dynamically coupling the tops of the respective platforms would substantially and adversely affect the loading of the platforms by resisting independent movement. Therefore, any walkway or piping joining adjacent offshore platforms must not dynamically couple the platforms' respective responses to natural environmental forces.

Truly flexible means for transporting fluid between the towers generally lack the strength and reliability of pipeline connection. Further, flexible alternatives with higher strength characteristics such as metal woven hose may not be attractive after economic consideration in relation to pipeline. Therefore, a suitable pipeline configuration for fluid transfer would be preferred.

The prior art has provided a bridge between offshore platforms in which a substantially rigid frame having a lost motion sliding joint at one end supports a pipeline having a conventional U-shaped expansion loop. The expansion loop of this known embodiment disperses elastic strain in response to relative platform movement as localized bending moments in a relatively limited portion of the pipeline at the conventional expansion loop. Such repeated and concentrated loading of the pipeline at the expansion loop shortens its useful life. Further, this configuration of expansion loops is not conducive to support and mounting on the bridge itself. Rather, the U-shaped expansion loops require utilization of the very expensively provided platform deck space. Even apart from the relative expense, the U-shaped expansion loop configuration seriously limits the number of pipelines which can communicate between the platforms across a single bridge.

In addition, the relative expense of offshore construction favors modular construction in which a bridge comprising a frame, walkway and complete pipeline assembly is suitable for onshore fabrication and subsequent transportation to the offshore location for installation. This further discourages the use of U-shaped expansion loops which must be fabricated on deck and particularly discourages the use of torsion expansion loops on the platform deck. The later alternative has also been found to be inefficient in the utilization of platform deck space and relatively limiting in the number of pipelines which can be accomodated.

SUMMARY OF THE INVENTION

It is therefore an object of present invention to provide a utility bridge having a pipeline in which a high degree of longitudinal flexure is allowed by elastically distrubuting the strain over a substantial length of expansion loops mounted on the bridge.

It is a further object of the present invention to provide a bridge having a pipeline array in which a large number of pipelines are supported on a substantially rigid frame without interfering with one another in the attendant flexure of their respective expansion loops in response to relative motion between the connected facilities.

Finally, it is an object of present to maximize onshore fabrication of a modular bridge suitable for installation between adjacent offshore platforms.

Toward the fulfillment of these and other objects for connecting adjacent offshore platforms, the utility bridge of the present invention supports a plurality of helical pipelines having torsional expansion loops which are supported by a substantially rigid frame which is provided with a means to prevent coupling of the dynamic responses of the respective offshore platforms. Further, a walkway is provided along the frame to permit convenient pedestrian mobility between the platforms.

BRIEF DESCRIPTION OF THE DRAWINGS

The above brief description as well as further objects, features and advantages of the present invention will be more fully appreciated by reference to the following detailed description of the presently preferred, but nonetheless illustrative, embodiment of the present invention with reference to the accompanying drawings in which:

FIG. 1 is a side elevational view of a utility bridge for connecting adjacent offshore platforms in accordance with the prior art;

FIG. 2 is a schematic overhead view of adjacent offshore platforms connected with a utility bridge in accordance with the present invention;

FIG. 3 is a side elevational view in which a modular utility bridge constructed in accordance with the present invention is being installed;

FIG. 4 is a side elevational view of a utility bridge constructed in accordance with present invention;

FIG. 5 is a simplified perspective view illustrating the relative position of two helical pipelines in a utility bridge constructed in accordance with present invention;

A DETAILED DESCRIPTION OF THE PREFERRED EMBODIMENT

Figure 6:
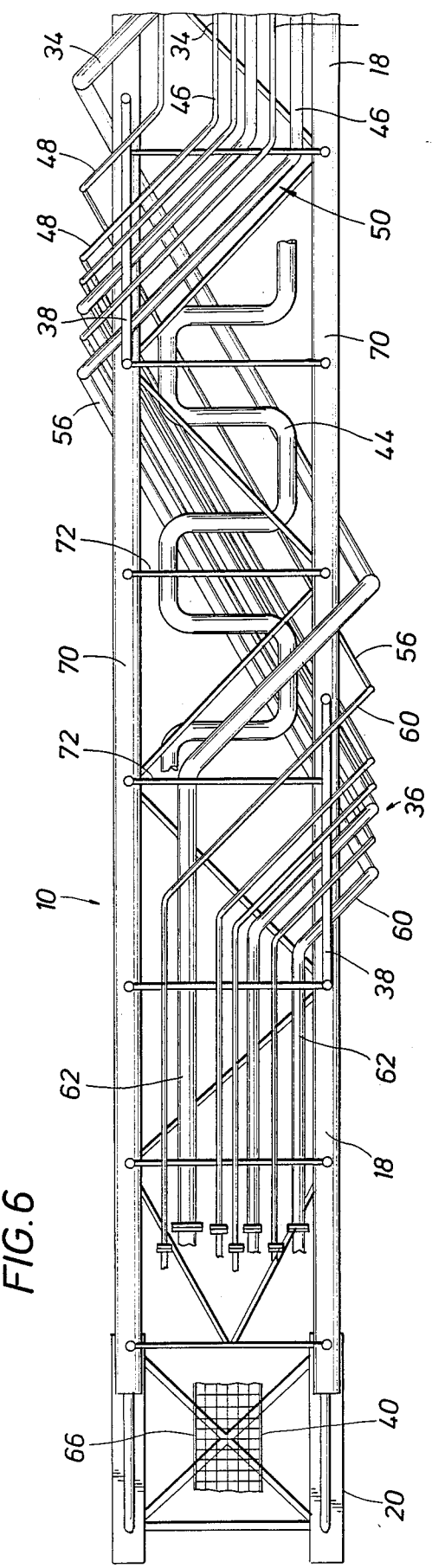
FIG. 6 is an overhead view of a portion of a utility bridge constructed in accordance with the present invention.

FIG. 1 illustrates a utility bridge 11 constructed in accordance with the prior art which connects adjacent first and second facilities, here offshore platforms 12 and 14, across an open expanse of water 16. Bridge 11 provides a substantially rigid frame 18 extending from a fixed end 22 at platform 14 to a sliding end 20 at platform 12. Frame 18 supports a conventional pipeline 23 which communicates between platforms 12 and 14 and terminates at a conventional pipe expansion loop 25 having a substantially U-shaped configuration which is supported by platform 12.

FIG. 2 is a schematic overhead view of offshore platforms 12 and 14 connected by a utility bridge constructed in accordance with the present invention which is designated with reference numeral 10. In this embodiment, utility bridge 10 has a fixed end 22 connected to platform 14 and a sliding end 20 connected platform 12. The relation of platforms 12 and 14 in this view illustrates a number of factors which may cause the platforms to respond differently to natural environmental forces acting on the respective platforms. For instance, the relative orientation of tower legs 26 in each of the platforms would suggested different dynamic responses, and significant difference in the relative sizes of platform decks 28 for the respective offshore platforms suggest different weights which may result in variances of dynamic response. Further, the relative distance between platforms 12 and 14 is sufficient for the arrival of wave forces approaching from most directions to impact at sufficiently separated intervals to cause the dynamic response to be out of phase between the platforms.

FIG. 4 is a side elevational view illustrating utility bridge 10 in detail. In this embodiment a substantially rigid frame, here space frame 18, is connected at its fixed end 22 to platform 14 at fixed base 30 and is connected at its sliding end 20 to platform 12 through means 32 for dynamically decoupling the frame such that the rigid frame does not longitudinally transmit a substantial horizontal load from one offshore platform to the other.

A plurality of helical pipelines 34, each having a torsional expansion loop or torsion expansion loop 36, are supported on rigid frame 18 to provide fluid communication between platforms 12 and 14. Each of helical pipelines 34 terminates at a pipe flange 35 presented at the respective platforms. In the preferred embodiment, helical pipelines 34 are supported by rigid frame 18 on sliding pads 38 which provide a means to reduce the friction between the frame and the helical pipelines supported thereby. Friction may be further reduced by coating sliding pads 38 with tetrafloroethylene and coating the helical pipelines with rubber or another friction reducing combination to minimize resistance to the free torsional distribution of strain in the helical pipelines which results from relative displacement of platforms 12 and 14.

In the preferred embodiment, utility bridge 10 is provided with a catwalk 40 having guardrails 42 to provide safe, convenient pedestrian personnel mobility between the offshore platforms. A further feature of the preferred embodiment in FIG. 4 is drainline 44, which extends the length of the utility bridge for gravity feed fluid communication between the respective platforms. To the horizontal perspective of this Figure, drainline 44 is seen to be coplanar which will facilitate the gravity feed.

FIG. 5 is a perspective view of a portion of utility bridge 10 illustrating the presently preferred pipeline configuration with the relative positions of two helical pipelines 34 to one another and to frame 18 in the vicinity of torsion expansion loops 36. In this view, utility bridge 10 has been substantially simplified in order to best illustrate the position and support of torsion expansion loops 36 which, in the preferred embodiment, are placed toward sliding end 20 of space frame 18 having a top 18A, sides 18B and 18D and a bottom 18C.

A variety of coiled or helical configurations of pipelines 34 and torsion expansion loops 36 may be employed to distribute elastic torsional strain over a substantial length of the helical pipeline in order to provide flexure in response to relative platform motion. However, the illustrated embodiment provides several advantages in that it promotes convenient handling of a large number of pipelines, it is uniquely suited for support from a rectangular frame configuration, and it is exterior to the rigid frame for mininal interference to flexure motions yet it is compact against the frame to facilitate transportation as a pre-fabricated module.

For the purpose of this discussion, flow in helical pipelines 34 is presumed to flow from platform 14 to platform 12. Of course, flow may be established in either or both directions. Further, although only two helical pipelines are illustrated for the purposes of clarity, it will be seen that these helical pipelines are representative of a pipeline array 50 in which a plurality of helical pipelines 34 are arranged in sequential, parallel sections along frame 18. See also FIGS. 6 and 7.

Returning to FIG. 5, helical pipelines 34 run most of their length longitudinally along the top of the frame 18. It is convenient to support the pipelines to the frame on sliding end 20 by sleeves 64 which slidingly receive the straight runs of the pipelines. Torsion expansion loops 36 interrupt the straight runs of the helical pipelines separating an upstream longitudinal section 46 from a downstream longitudinal section 62. Then fixed sleeves 65 fixedly secure pipelines 34 to frame 18 on the side of the torsion expansion loops nearest fixed base 30 of the space frame. See also FIG. 4.

Returning to torsion expansion loops 36, helical pipelines 34 of pipeline array 50 enter a helical section 52 at the torsion expansion loops with an upstream upper transverse section 48 which angles across top 18A to side 18B of space frame 18. There the torsion expansion loops 36 of helical section 52 of the pipeline array continue as parallel, essentially vertical pipelines run from the downstream end of the upstream upper transverse section 48 at top 18A of rigid frame 18 to descend along first side 18B to bottom 18C of rigid frame 18 in a section identified as an upstream vertical section 54. From there the pipeline array 50 of helical pipelines 34 angle across bottom 18C of rigid frame 18 to second side 18D in a run designated as lower transverse section 56. The helical pipelines rise from bottom 18C along side 18D to top 18B of space frame 18 in a vertical downstream section 58 of the pipeline array. There the helical pipelines angle across top 18A of the space frame in a downstream upper transverse section to return helical pipelines 34 to their longitudinal run on top of the frame in downstream longitudinal section 62.

Bending stress in helical pipelines 34 is minimized by placing sliding pad 38 on the side edges of top 18A of space frame 18. The upstream and downstream vertical sections are then adjacent sliding pads 38 for support and the weight of the pipelines load axially in vertical descent from the sliding pads. In addition, it is preferred to place further sliding pads suspended from bottom 18C of the space frame to support lower transverse section 56. See also FIG. 8.

FIG. 6 is a partially broken away top elevational view of utility bridge 10 illustrating a large number of helical pipes 34 within pipeline array 50 each having a torsion expansion loop 36. From upstream longitudinal section 46, through upstream upper transverse section 48, lower transverse section 56, downstream upper transverse section 60, and to downstream longitudinal section 62. Of course, upstream vertical section 54 and downstream vertical section 58 are not well illustrated in the overhead view of FIG. 6, but are illustrated in the side elevational view of FIG. 7.

Returning to FIG. 6, a segment of drainline 44 is illustrated within space frame 18 showing a plurality of conventional expansion pipeline loops. Other portions of the drainline as well as portions of catwalk 40 including its grate 66 have been broken away from FIG. 6 for the purpose of simplicity. FIG. 6 also illustrates the preferred embodiment of a multiple-tiered slide pad 38 which maximizes the number of helical pipelines 34 which may wrap about space frame 18 in pipeline array 50. Thus, some of helical pipelines 34 are carried on slide pad 38 as viewed from the upper view and other helical pipelines pass underneath slide pad 38 and may engage another slide pad provided as a friction reducing coating on the upper surface of space frame 18.

Figure 7:
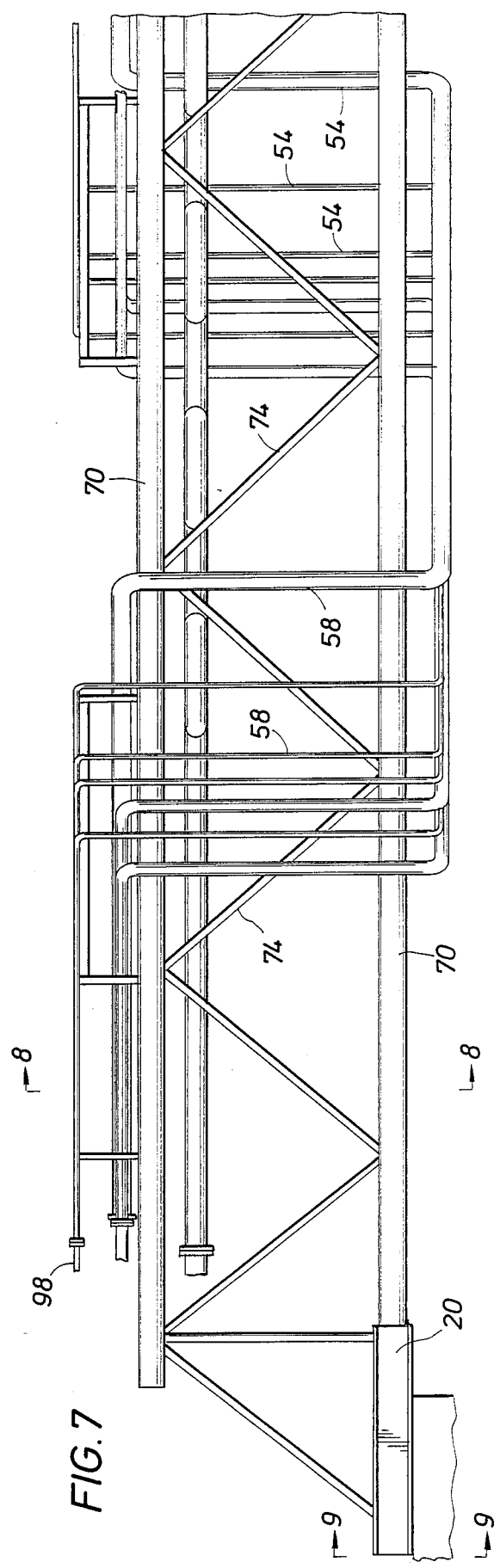
FIG. 7 is a side elevational view of the utility bridge illustrated in FIG. 6.

FIGS. 6 and 7 also serve to better illustrate the constituent members of space frame 18 including a plurality of parallel longitudinal beams 70 connected by girt members 72 and a plurality of brace members 74.

Figure 8:
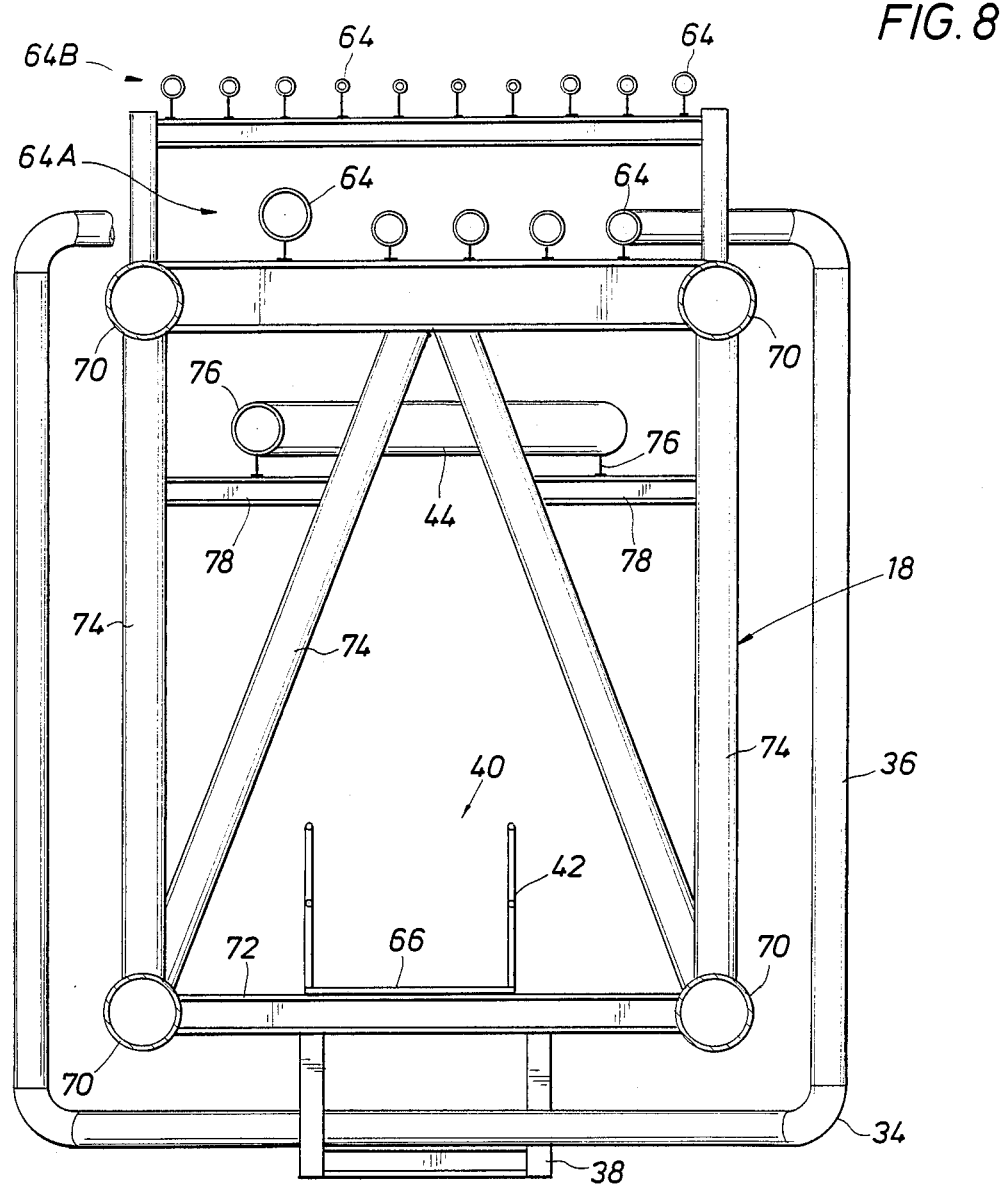
FIG. 8 is a cross-sectional view taken along line 8—8 of FIG. 7 of a bridge constructed in accordance with present invention.

FIG. 8 is a cross sectional view of utility bridge 10 taken at line 8—8 of FIG. 7. Here space frame 18 is illustrated including beams 70 connected by girts 72 and further supported by braces 74. Most of one torsion expansion loop 36 of helical pipeline 34 is illustrated wrapped around the outside of space frame 18. Again, helical pipeline 34 is supported by the space frame through slide pads 38 and sliding sleeves 64 here arranged in a first tier 64A and a second tier 64B above rigid frame 18. Drainline 44 winds within the space frame having sliding sleeves 76 mounting it over supports 78 attached to space frame 18. Catwalk 40 is also disposed within the interior of space frame 18 and includes guard rails 42 along both sides of a walkway or grate 66 which runs the length of the utility bridge.

Figure 9:
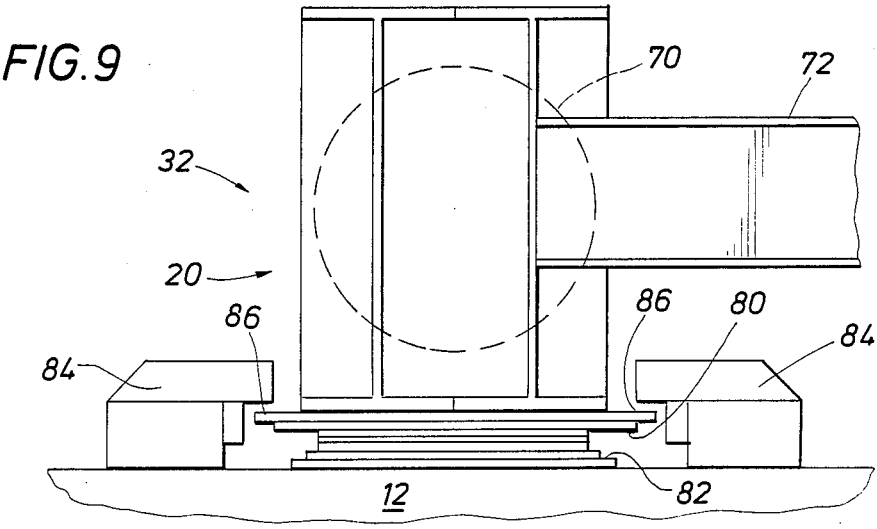
FIG. 9 is a cross-sectional view taken at line 9—9 of FIG. 7 of a bridge constructed in accordance with the present invention.

FIG. 9 is a cross-sectional close-up of the preferred means for dynamically decoupling the substantially rigid frame in its connection to offshore platform 12 such that movement of one offshore platform does not become a substantial force thrust upon the other. In this preferred embodiment, means 32 for dynamically decoupling the platforms includes a sliding end 20 connected to beam 70 and carrying a top bearing pad 80 there beneath. A bottom bearing pad 82 is affixed to the deck of platform 12 disposed to slidingly receive upper bearing pad 80. Freedom of movement is then restricted to a longitudinal direction with opposing clamps 84 affixed to the deck of platform 12 and slidingly engaged over a flange 86 of upper bearing plate 80.

The utility bridge constructed in accordance with the present invention may be fabricated by steps including constructing a utility bridge module 24 in onshore facilities, transporting the utility bridge module to location, lifting it into position, fastening it between adjacent offshore platforms 12 and 14 and connecting helical pipeline 34 to the fluid transport facilities of the respective offshore platforms.

Fabrication of utility bridge module 24 begins with construction of the substantial rigid frame, preferably in the form of space frame 18 which may be seen in the fully assembled illustrations of FIGS. 4, 6, 7 and 8.

Helical pipelines 34, best illustrated in FIG. 5, are assembled and installed onto frame 18 in a manner which facilitates the distribution of elastic strain within torsional expansion loops 36. Each helical pipeline is provided with a torsional expansion loop between longitudinal sections 46 and 62 which terminate at pipe flanges 35. The installation of the helical pipelines onto the frame preferably include steps to reduce friction so as to aid the distribution of elastic strain. This may include installing sliding pads 38 on frame 18 and coating the sliding pad with tetrafloroethylene and further coating the helical pipelines, at least at their interface with the sliding pads, with rubber which would reduce both friction and corrosion problems.

Sliding sleeves 64 are installed on the helical pipelines and are then connected to frame 18 on the sliding end thereof in a manner that allows longitudinal displacement between the helical pipelines and the frame through the sliding sleeves. Again, friction may be reduced by coating the interface with tetrafloroethylene.

In the preferred embodiment, fixed sleeves 65 are connected to the helical piplines on the other side of torsion expansion loops 36 and are then secured to frame 18. See particularly FIG. 5.

The prefabricated frame and installed helical pipelines, together with any additional members such as drainline 44, catwalk 40, etc., make up the prefabricated utility bridge module 24 which is then ready for transport to location by barge.

Means for dynamically decoupling the connected offshore platforms is provided, in the preferred embodiment, by preparing one end of utility bridge module 24 as sliding end 20 of utility bridge 10. Thus lower bearing plate 82 is attached to offshore platform 12 before the utility bridge module is placed. Further, upper bearing plate 80 is mounted on frame 18 prior to such placement of the utility bridge module.

At location, the utility bridge module is lifted by a crane 90 provided on barge 92. See FIG. 3. A lift line 94 of crane 90 is attached to utility bridge module 24 at frame 18 through padeyes 96 presented on beams 70.

Placed in position, fixed end 22 of utility bridge module 24 is secured to one of the offshore platforms through installation of fixed base 30.

At the other adjacent offshore platform, upper bearing plate 80 is placed onto lower bearing plate 82. Then clamps are secured over upper bearing plate flanges 86 in a manner that allows longitudal displacement only. See FIG. 9.

Construction of the utility bridge is completed with the connection of pipe flanges 35 of helical pipelines 34 with fluid transport facilities 98 on the respective platforms.

In operation of the preferred embodiment of utility bridge 10, relative movement between platforms 12 and 14 is accommodated for by substantial rigid space frame 18 in sliding end 20 of the utility bridge. Each end of helical pipeline 34 is connected at flange 35 to a pipe manifold rigidly attached to the respective platforms and moving therewith. Relative motion between the connected offshore platforms results in longitudinal displacement in the helical pipeline represented by arrow 66 in FIG. 5. Of course, minor elastic strain may be actually accommodated by the straight longitudinal sections of helical pipelines 34. However, the bulk of the longitudinal displacment is transmitted axially to torsion expansion loops 36 and there converted to torsion strain represented by arrows 68. The stretching under tension and the compression of the torsion expansion loops is provided by the low friction interface with the supporting rigid frame, thereby allowing the elastic strain to torsionally distribute about the torsion expansion loops. Thus, stress in the helical pipelines is primarily transmitted axially and distributed torsionally to accommodate longitudinal deflection. This represents a substantial benefit to the pipeline since the strength of the pipeline is greater in both these modes than in response to bending stress which is the principle flexure mode in pipelines of prior art utility bridges. Further, the torsion expansion loops provide less stress concentration than the conventional U-shaped expansion loops of the prior art.

Although the utility bridge application described in the preferred embodiment is set between adjacent offshore platforms, it will be seen from this disclosure by those skilled in the art that the utility bridge of the present invention may connect other facilities subject to relative motion due to wave action on at least one of the facilities. For example, the utility bridge of the present invention might connect an offshore platform and a tanker or even port facilities and a tanker.

Other modifications, changes and substitutions are intended in the foregoing disclosure and in some instances some features of the invention will be employed without a corresponding use of other features. Accordingly, it is appropriate that the appending claims be construed broadly and in a manner consistent with the spirit and scope of the invention herein.

What is claimed is:

1. A bridge for connecting adjacent first and second facilities which are subjected to relative motion due to wave action on at least one of the facilities, said bridge comprising:
   (A) an elongated, substantially rigid frame connecting said first and second facilities;
   (B) means for dynamically decoupling the substantially rigid frame effective to limit the translation of force between the adjacent facilities through the substantially rigid frame; and
   (C) a plurality of helical pipelines having torsion expansion loops connected between the adjacent first and second facilities, said helical pipelines being supported by the substantially rigid frame.

2. A bridge in accordance with claim 1 wherein the first and second facilities are adjacent offshore platforms.

3. A bridge in accordance with claim 2 wherein the substantially rigid frame is a space frame.

4. a bridge in accordance with claim 3 further comprising a catwalk extending longitudinally through the space frame.

5. A bridge for connecting adjacent offshore platforms, said bridge comprising:
   (A) an elongated space frame connecting said offshore platforms;
   (B) means for dynamically decoupling the space frame effective to prevent the translation of movement between the adjacent offshore platforms through the space frame; and
   (C) a plurality of helical pipelines having torsion expansion loops connected between the adjacent offshore platforms, said helical pipelines being supported by the space frame.

6. A bridge in accordance with claim 5 further comprising means for reducing the friction of sliding motion between the space frame and the plurality of helical pipelines supported thereby.

7. A bridge in accordance with claim 5 wherein the space frame is substantially rectangular having a top, a first side, a second side and a bottom, and wherein the plurality of helical pipelines are arranged in a pipeline array comprising:
   (A) an upstream longitudinal section in which the helical pipelines run substantially parallel with the space frame;
   (B) a helical section comprising:
      (1) an upstream upper transverse section in which the helical pipelines are parallel to each other and angle from the downstream end of the upstream longitudinal section of the pipeline array across the top of the space frame to a first side of the space frame;
      (2) an upstream vertical section in which the helical pipelines are parallel to each other and run substantially vertically from the upstream upper transverse section at the top of the first side of the space frame to the bottom of the first side of the space frame;
      (3) a lower transverse section in which the helical pipelines are parallel to each other and angle from the upstream vertical section to which it is connected across the bottom of the space frame to the second side;
      (4) a downstream vertical section in which the helical pipelines are parallel to each other and run substantially vertically upward from the lower transverse section at the bottom of the space frame to the top of the second side of the space frame; and
      (5) a downstream upper transverse section in which the helical pipelines are parallel to each other and angle from the downstream vertical section at the top of the second side of the space frame across the top of the space frame; and
      (6) a downstream longitudinal section in which the helical pipelines are parallel to each other and run from the downstream upper transverse section to the other platform and proceeding substantially parallel to the space frame.

8. A bridge in accordance with claim 7 wherein the means for reducing friction comprises:
(A) slide pads connected to the space frame which support the helical pipelines at the upstream upper transverse, lower transverse, and the downstream upper transverse sections; and
(B) sleeves connected to the space frame which slidably receive the helical pipelines within the upstream and downstream longitudinal sections.

9. A bridge in accordance with claim 8 wherein the means for reducing friction further comprises:
(A) a tetrafluroethylene coating on the slide pads; and
(B) a rubber coating on the helical pipelines at the upper transverse, lower transverse, and the downstream upper transverse sections.

10. A bridge in accordance with claim 8 wherein the means for decoupling the space frame effective to prevent the translation of movement between the adjacent offshore platforms comprises:
(A) first mounting means for fixedly securing a first end of the space frame to one of the offshore platforms; and
(B) second mounting means for slidably engaging the second end of the space frame to the other offshore platform.

11. A bridge in accordance with claim 10 wherein the second mounting means comprises:
(A) a top bearing pad connecting to the second end of the space frame and presenting opposing sides substantially parallel with the extension of the space frame;
(B) a bottom bearing pad connected to the other offshore platform disposed to receive the top bearing pad; and
(C) a plurality of opposing clamps mounted on the other offshore platform to slidably secure the top bearing pad in position above the bottom bearing pad.

12. A bridge in accordance with claim 10 wherein the helical section of the pipeline array wraps around the exterior of the space frame substantially at second end of the space frame.

13. A bridge in accordance with claim 12 wherein the space frame comprises:
(A) a plurality of substantially parallel longitudinal beams running substantially the length of the space frame;
(B) girt members connecting the longitudinal beams together to define an elongated substantially rectangular framework having a beam at each corner; and
(C) brace members connecting between the beams.

14. A bridge in accordance with claim 13, further comprising a catwalk extending the length of the space frame, said catwalk comprising:
(A) a horizontal grate having opposing elongated sides extending the length of the space frame, said horizontal grate being supported by the lower most horizontal girt members; and
(B) a guard rail projecting upward from each side of the grate.

15. A bridge in accordance with claim 14, further comprising at least one gravity drainline connecting the adjacent offshore platforms and having a plurality of horizontal bending expansion loops such that the drainline and each of the horizontal bending expansion loops are presented substantially within a single plane which slopes downwardly across the space frame, said gravity drainline being supported by the space frame.

16. A bridge in accordance with claim 13, wherein the slide pads and sliding sleeves are presented at multiple tiers above and below the rigid frame.

17. A bridge in accordance with claim 8, wherein the slide pads and sleeves are presented at multiple tiers connected above and below the space frame.

18. A bridge constructed in accordance with claim 17, further comprising lift eyes connected to the beams at the top of the space frame effective to permit lifting of the bridge into position between the adjacent offshore platforms.

19. A bridge for connecting adjacent offshore platforms, said bridge comprising:
(A) an elongated, space frame having a longitudinal axis extending between said offshore platform, comprising:
(1) a plurality of substantially parallel longitudinal beams running substantially the length of the space frame; and
(2) girt members connecting the beams together to define an elongated substantially rectangular frame having a beam at each corner; and
(3) brace members further connecting the beams;
(B) means for the space frame to decouple the translation of movement between the adjacent offshore platforms comprising:
(1) first mounting means for fixedly securing a first end of the space frame to one of the offshore platforms; and
(2) second mounting means for slidably engaging the second end at the other offshore platform, said second mounting means comprising:
(i) a top bearing pad connecting to the second of the space frame and presenting opposing sides substantially parallel with the extension of the space frame;
(ii) a bottom bearing pad connected to the other offshore platform disposed to receive the top bearing pad; and
(iii) opposing clamps mounted on the other offshore platform to secure the top bearing pad in position above the bottom bearing pad with freedom to slidably move along the longitudinal axis of the space frame;
(C) a plurality of helical pipelines having torsion expansion loops, said helical pipelines arranged into a pipeline array which wraps around the exterior of the space frame and is supported by the space frame, said pipeline array comprising:
(1) an upstream longitudinal horizontal section in which the helical pipelines are parallel on top of the space frame and run substantially parallel with the space frame;
(2) a helical section comprising:
(i) an upstream upper transverse section in which the helical pipelines are parallel to each other and angle from the downstream end of the pipeline array obliquely across the top of the space frame to a first side of the space frame;
(ii) an upstream vertical section in which the helical pipelines are parallel to each other and run substantially vertically from the upstream upper transverse section at the top of the first side of the space frame to the bottom of the first side of the space frame;

(iii) a lower transverse section in which the helical pipeline are parallel to each other and angle from the upstream vertical section to which it is connected obliquely across the bottom of the space frame to the second side;

(iv) a downstream vertical section in which the helical pipelines are parallel to each other and run substantially vertically upward from the lower transverse section at the bottom to the top of the second side of the space frame;

(v) a downstream upper transverse section in which the helical pipelines are parallel to each other and angle from the downstream vertical section at the top of the second side of the space frame obliquely across the top of the space frame; and (vi) a downstream longitudinal horizontal section in which the helical pipelines are parallel to each other and run from the downstream upper transverse section to the other platforms and proceeding substantially parallel to the space frame;

(D) a means for reducing the friction of the sliding motion between the space frame and the plurality of helical pipelines supported thereby comprising:

(1) slide pads connected to the space frame which support the helical pipelines at the upstream upper transverse, lower transverse, and the downstream upper transverse sections; and (2) sliding sleeves connected to the space frame which slidably receive the helical pipelines within the downstream longitudinal section;

(E) a gravity drainline supported by the space frame therewith and having a plurality of horizontal bend expansion loops such that the drainline, including its horizontal bending expansion loops, is presented within a single plane which slopes downwardly across the space frame;

(F) a catwalk extending the length of the space frame, said catwalk comprising:

(1) a horizontal grate extending the length of the space frame supported by girt members at the bottom of the space frame; and (2) a pair of guard rails projecting upwardly from the side of the grate along its length; and (G) pad eyes connected to the top of the space frame, to permit lifting of the bridge into position between the adjacent offshore platforms.

20. A method of constructing a utility bridge for connecting a fluid transport facilities of adjacent offshore platforms, said method comprising:

(A) fabricating a modular utility bridge module comprising:

(1) constructing a substantially rigid frame;

(2) installing slide pads on the frame;

(3) fabricating a plurality of helical pipelines, each comprising:

(i) fabricating a torsion expansion loop;

(ii) fabricating longitudinal sections on either side of the torsion expansion loop; and (iii) placing receiving flanges on the ends of the longitudinal sections;

(4) installing the helical pipelines onto the frame in a manner providing for elastic strain in the helical pipeline to distribute about the torsion expansion loops;

(B) transporting the utility bridge module to the adjacent offshore platforms;

(C) lifting the utility bridge module to position between the adjacent offshore platforms;

(D) fastening the frame of the utility bridge module to the adjacent offshore platforms in a manner which prevents dynamic coupling of the adjacent offshore platforms through the substantially rigid frame; and (E) connecting the pipe flanges of the helical pipelines to the fluid transport facilities of the adjacent offshore platforms.

21. A method for constructing a utility bridge in accordance with claim 20 wherein installing the helical pipelines onto the frame in a manner providing for elastic strain in the helical pipelines to distribute about the torsion expansion loops comprises:

(A) installing sliding pads on the substantially rigid frame;

(B) installing sliding sleeves on the helical pipelines on one side of the torsion expansion loops;

(C) fixedly securing fixed sleeves to longitudinal sections of the helical pipelines on the other side of the torsion expansion loops;

(D) placing the helical pipelines along the frame such that the torsion expansion loops encircle the substantially rigid frame and are supported by the sliding pads;

(E) connecting the sliding sleeves to the substantially rigid frame such that the helical pipelines are free to slide longitudinally with respect to the substantially rigid frames; and (F) fixedly connecting the fixed sleeves to the substantially rigid frame.

22. A method for contructing a utility bridge in accordance with claim 21 wherein the substantially rigid frame comprises connecting at least four longitudinal beams with a plurality of girts and braces to establish a rectangular space frame.

23. A method for constructing a utility bridge in accordance with claim 22 wherein constructing the substantially rigid frame further comprises assembling a catwalk within the space frame which extends longitudinally therethrough.

24. A method for constructing a utility bridge in accordance with claim 23 wherein lifting the utility bridge module to the position between the adjacent offshore platforms comprises lifting the utility bridge module with a crane having a lifting cable connected to padeyes affixed to the beams of the space frame.

25. A method for constructing a utility bridge in accordance with claim 24, further comprising a step of reducing the friction of sliding motion between the substantially rigid frame and the helical pipelines supported thereby, comprising:

(A) providing the slide pads with a tetrafluroethylene coating; and (B) coating the helical pipelines in the vicinity of the slide pads with rubber; and (C) providing the sliding sleeve with a tetrafluroethylene coating at its sliding interface.

26. A method for constructing a utility bridge in accordance with claim 25 wherein fastening the utility bridge module to the adjacent offshore platforms further comprises:

(A) securing a fixed base to one of the adjacent offshore platforms:

(B) installing a lower bearing plate on the other adjacent offshore platform;

(C) mounting an upper bearing plate to a sliding end of the space frame in a manner to present upper bearing plate flanges longitudinally thereto;
(D) connecting the fixed base to the fixed end of the one adjacent offshore platform;

(E) positioning the mounted upper bearing plate onto the installed lower bearing plate; and
(F) placing clamps over the upper bearing plate flanges in a manner which allows the longitudinal deflection of the space frame.

* * * * *